US 6,550,445 B2

(12) United States Patent
Umezono et al.

(10) Patent No.: US 6,550,445 B2
(45) Date of Patent: Apr. 22, 2003

(54) SPARK-IGNITION DIRECT INJECTION ENGINE WITH SUPERCHARGER

(75) Inventors: Kazuaki Umezono, Hiroshima (JP); Hiroyasu Uchida, Hiroshima (JP); Mikihito Fujii, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 10/195,306

(22) Filed: Jul. 16, 2002

(65) Prior Publication Data

US 2003/0024499 A1 Feb. 6, 2003

(30) Foreign Application Priority Data

Jul. 17, 2001 (JP) ........................................ 2001-216479

(51) Int. Cl.⁷ ................................................ F02B 31/00
(52) U.S. Cl. ...................... 123/301; 123/306; 123/399; 123/564
(58) Field of Search ................................ 123/301, 306, 123/399, 564, 559.1, 395

(56) References Cited

U.S. PATENT DOCUMENTS

| 4,611,568 A | * | 9/1986 | Onaka et al. | 123/559.3 |
| 4,958,606 A | * | 9/1990 | Hitomi et al. | 123/316 |
| 5,044,162 A | * | 9/1991 | Kinoshita et al. | 60/602 |
| 5,239,960 A |   | 8/1993 | Sasaki et al. |           |
| 6,279,551 B1 |  | 8/2001 | Iwano et al. |           |

FOREIGN PATENT DOCUMENTS

| DE | 100 16 858 A1 | 11/2000 |
| JP | 07-293304 | 11/1995 |
| JP | 10-274071 A | 10/1998 |
| JP | 2000-274278 | 10/2000 |

* cited by examiner

Primary Examiner—Bibhu Mohanty
(74) Attorney, Agent, or Firm—Nixon Peabody LLP; Donald R. Studebaker

(57) ABSTRACT

A spark-ignition type 4-cycle direct injection engine is provided with a turbocharger for boosting intake air and an injector for directly injecting fuel to a combustion chamber within a cylinder, wherein in a λ=1 region (II) and an enriched region (III) on the high-speed high-load side, fuel is injected during the intake stroke of the cylinder to attain a state of homogenous combustion. When the engine is in the high-speed side (specific region) of the enriched region (III), the air-fuel ratio A/F of the air-fuel mixture in the cylinder is controlled to become A/F≦13, the tumble flow T is strengthened by closing the TSCVs, and the opening degree of a wastegate valve of the turbocharger is controlled in order to increase the maximum boost pressure and compensate the drop in intake efficiency that is caused by closing the TSCVs. Thus, in the high-speed side of the enriched region (III), a maximum output of the engine is ensured and the dependability of the exhaust system is secured while the PM in the exhaust can be decreased.

7 Claims, 12 Drawing Sheets

SPARK-IGNITION DIRECT INJECTION ENGINE WITH SUPERCHARGER

BACKGROUND OF THE INVENTION

The present invention relates to a spark-ignition direct injection engine with supercharger, which has been provided with a supercharger for boosting intake air and which stratifies fuel that has been directly injected into the combustion chamber around the electrodes of the spark plugs within the cylinders and combusts it, and in particular relates to the technological field of combustion control in a specific driving region on the high-speed high-load side.

In a conventional example of this type of spark-ignition direct injection engine with supercharger disclosed in JP 2000-274278A, for example, the supercharger is stopped when the engine is in a state of stratified combustion, whereas flow within the cylinder is strengthened by boosting when the engine is in a state of homogenous combustion. This means that during low speeds and low loads at which a state of stratified combustion is assumed, the boosting of intake air by the supercharger is stopped or inhibited to leave a relatively weak state of flow within the cylinder, thereby keeping the air-fuel mixture from diffusing within the combustion chamber and thus achieving suitable stratification. On the other hand, during high-speeds and high-loads at which a state of homogenous combustion is assumed, the flow within the cylinders is strengthened by boosting to adequately mix the intake air with the large volume of fuel injected into the combustion chamber during the intake stroke and form an air-fuel mixture that is as uniform as possible.

In general, in an engine with a supercharger, only a portion of the exhaust is supplied to the supercharger when there is a high exhaust flow and/or pressure, and the rest is released into the air to keep the boost pressure of the intake air due to the supercharger below a target value (maximum boost pressure). This also applies to the above conventional example, where a portion of the exhaust bypasses the supercharger and flows down the exhaust pipe when the engine is in a high-speed high-load driving state. A portion of the energy held by the high pressure exhaust is discarded at this time.

However, due to the structure of a spark-ignition direct injection engine, which directly injects fuel into the combustion chamber within the cylinders of the engine, the period in a single combustion cycle during which fuel injection is possible is restricted to the intake stroke and the compression stroke of the cylinders. Thus, not enough time can be secured between fuel injection and ignition, and during high-load operation where a greater volume of fuel is injected, it is difficult to sufficiently vaporize and atomize the fuel before the cylinders are fired. As a consequence, a portion of the fuel is baked, and this leads to the discharge of particulate matter (hereinafter, referred to as PM) like in diesel engines.

A greater volume of fuel is injected particularly when the engine is in a high-speed high-load driving state, however, the time interval during which the fuel can be injected is shortened inversely proportional to the increase in engine revolution speed. This retards the end of the fuel injection, which further shortens the period between fuel injection and ignition and complicates vaporization and atomization. Also, there is a drop in the flow within the cylinder during the compression stroke of the cylinder compared to during the intake stroke, and thus during the compression stroke it becomes difficult to promote the fuel injected into the cylinder to mix with the air. This also hinders fuel vaporization and atomization.

Additionally, giving consideration to exhaust system reliability, in spark-ignition engines, the air-fuel ratio is generally controlled in a specific driving region on the high-speed or the high-load side so that it is richer than the theoretical air-fuel ratio in order to keep the exhaust temperature from rising due to the latent heat of excess fuel. Thus, even if the intake air is boosted by the supercharger to strengthen the flow within the cylinder when the engine is in this specific driving region, as in the above conventional example, the resulting effect is surpassed by the effect of the large volume of fuel that is supplied, making the above problem of PM even more conspicuous.

The present invention was arrived at in light of the above problems. It is an object of the present invention to exploit the fact that spark-ignition direct injection engines that are provided with a supercharger conventionally discard a portion of the exhaust energy during high-speed high-load engine operation, and a solution has been adopted to control, for example, the boost pressure or the like particularly in a specific driving region on the high-speed high-load side in order to ensure maximum engine output and exhaust system reliability while also achieving a reduction in PM within the exhaust.

SUMMARY OF THE INVENTION

To achieve the above object, one solution presented by the present invention is to collect the portion of exhaust energy that has conventionally been discarded in the specific driving region on the high-speed high-load side, and effectively use it to maximize the strength of the flow within the cylinder.

More specifically, as shown illustratively in FIG. 1, it is a premise of a first aspect of the present invention that a spark-ignition type 4-cycle direct injection engine 1 is provided with a supercharger 40 for boosting intake air to the cylinder and a fuel injection valve 18 for directly injecting and supplying fuel to a combustion chamber 6 within the cylinders, and that fuel is injected during the intake stroke of the cylinder 2 by the fuel injection valve 18 in at least a supercharge region on a high-speed high-load side to attain a state of homogenous combustion.

This configuration is also provided with a flow strengthening means 30 for constricting the flow of intake air into the cylinder in order to strengthen the flow within the cylinder, a boost pressure adjustment means 42 for keeping the boost pressure of the intake air due to the supercharger 40 below a target boost pressure, an air-fuel ratio control means 50b for controlling an air-fuel ratio A/F in the cylinder to become A/F≦13 in a specific driving region that is established on the high-speed high-load side of the supercharge region, a flow control means 50c for increasing the amount of constriction on the intake air caused with the flow strengthening means 30 so as to relatively strengthen the flow in the cylinder in the specific driving region as compared to that in a region that is adjacent to the low-load side of the specific driving region, even if the engine revolution speed is the same, and a boost pressure control means 50d for controlling the boost pressure adjustment means 42 to relatively increase the target boost pressure in the specific driving region as compared to that in a region that is adjacent to a low-speed side of the specific driving region.

According to this configuration, first, when the engine 1 is in a predetermined high-speed high-load driving region (specific driving region), the air-fuel ratio within the cylinder 2 of the engine 1 is enriched by the air-fuel ratio control means 50b to become A/F≦13, and the temperature of the exhaust is kept from rising due to the latent heat of the overly large volume of fuel compared to the volume of air. Also, the boost pressure adjustment means 42 is controlled by the boost pressure control means 50d to raise the target boost pressure, and the flow strengthening means 30 is controlled by the flow control means 50c to increase the amount of constriction on the intake air, so that the combination of these actions strengthens the flow within the cylinder as much as possible and sufficiently promotes fuel vaporization and atomization.

That is, in the specific driving region on the high-speed high-load side, the exhaust energy that has conventionally been discarded is utilized to further boost the intake air with the supercharger 40, and this intake air can then be constricted to maximize the strength of the flow in the cylinders. A result of this is that a large volume of injected fuel can be sufficiently vaporized and atomized, the PM within the exhaust can be reduced, and a rise in the exhaust temperature due to the latent heat of the large volume of fuel can be effectively inhibited. The drop in intake efficiency as the intake air is constricted is compensated by the rise in boost pressure, and therefore that the maximum output of the engine 1 does not drop.

According to the engine of a second aspect of the present invention, the boost pressure control means increases the target boost pressure in order to compensate the drop in the intake efficiency that is caused when the flow control means controls the flow strengthening means to increase the amount of constriction on the intake air.

Thus, even when the engine is in the high-speed high-load specific region and the amount of constriction on the intake air by the flow strengthening means has been increased, which causes the intake efficiency of the cylinders to drop, the boost pressure is increased accordingly to compensate the drop in intake efficiency of the cylinders. Consequently, maximum engine output can be reliably maintained and fluctuations in the engine output are kept from occurring when the driving state of the engine shifts between the specific driving region and other driving regions.

According to the engine of a third aspect of the present invention, the flow control means is configured so that it minimizes the amount of constriction on the intake air due to the flow strengthening means in at least the supercharge region aside from the specific driving region.

Thus, in at least the supercharge region aside from the specific driving region, the drop in intake efficiency that accompanies the constriction of the intake air is minimized, and an improvement in fuel efficiency is achieved by the reduction in pumping loss. It should be noted that sufficient flow within the cylinders due to boosting can be obtained even if a special effort is not made to constrict the intake air outside the specific driving region, and thus PM discharge does not become a problem.

According to the engine of a fourth aspect of the present invention, the flow strengthening means is provided with a flow control valve that is disposed in an intake passage to the cylinder and with an actuator for adjusting the opening degree of the flow control valve, and the flow control means is configured so that it controls the opening degree of the flow control valve by the operation of the actuator.

Thus, the flow strengthening means is given a specific configuration, and the flow control valve is closed by the flow control means to constrict the intake air and thereby reliably strengthen the flow within the cylinders.

According to a fifth aspect of the invention, in the engine according to the fourth aspect of the invention, the opening degree of the flow control valve is reduced to strengthen the tumble flow, which serves as the flow in the cylinder, and the fuel injection valve is disposed in opposition to the tumble flow that flows through the combustion chamber in the cylinder during the compression stroke of the cylinder. Also, a fuel injection control means is provided, which in a predetermined driving region on the low-speed low-load side, injects fuel toward the tumble flow during the compression stroke of the cylinder through the fuel injection valve, so that the fuel injected by the fuel injection valve becomes a combustible air-fuel mixture in the spark period of the cylinder and stays near the electrode of the spark plug, and the flow control means is configured so that it closes the flow control valve in the predetermined driving region and in the specific driving region.

According to this configuration, when the engine is in a predetermined driving region on the low-speed low-load side, the flow control valve is closed by the flow control means in order to strengthen the tumble flow within the cylinder, and the fuel that is injected toward this tumble flow at a predetermined timing is slowed by the tumble flow and stratified around the electrode of the spark plug in the spark period of the cylinder. That is, in the low-speed region of the engine, in which there is low air intake speed, the tumble flow has originally been strengthened to balance it with the penetration of the fuel spray in order to attain suitable stratification of the air-fuel mixture.

However, when the engine is in the specific driving region on the high-speed high-load side, the tumble flow within the cylinder can be reliably strengthened by closing the flow control valve using the flow control means. That is, the flow control valve that is necessary in achieving a suitable stratified combustion at times of low-speed and low-load can also be effectively utilized at times of high-speed and high-load so that the effect of the fourth aspect of the invention can be adequately achieved without an increase in costs or a complication of the structure.

According to a sixth aspect of the present invention, a spark-ignition type 4-cycle direct injection engine is provided with a fuel injection valve for directly injecting and supplying fuel to a combustion chamber within a cylinder, a turbocharger for receiving exhaust from the combustion chamber and boosting intake air, and a controller for injecting fuel with the fuel injection valve during the intake stroke of the cylinder so as to attain a state of homogenous combustion in at least a supercharge region on the high-speed high-load side.

Moreover, it is also provided with a flow control valve that is disposed in an intake passage to the cylinder and with a relief valve for bypassing a portion of the exhaust from the combustion chamber to the downstream side of the turbocharger to keep the boost pressure of the intake air below the target boost pressure. Also, the controller is configured so that, in a specific driving region established on the high-speed high-load side within the supercharge region, it controls the volume of fuel injected by the fuel injection valve so that the air-fuel ratio A/F in the cylinder becomes A/F≦13, and also controls the opening degree of the flow control valve in order to relatively strengthen the flow in the cylinder as compared to that in a driving region adjacent to the low-load side of the specific driving region, even if the engine revolution speed is the same, and controls the opening degree of the relief valve in order to relatively increase the target boost pressure as compared to that in a driving region adjacent to the low-speed side of the specific driving region.

This configuration achieves the same effect as the first aspect of the invention.

In an engine according to a seventh aspect of the invention, in the engine according to the sixth aspect of the invention, the controller is configured to increase the target boost pressure by controlling the opening degree of the relief valve and thereby compensate the drop in intake efficiency that is caused when the amount of constriction on the intake air is increased by the flow control valve of the intake passage.

This configuration achieves the same effect as the second aspect of the invention.

As explained hereinabove, according to the spark-ignition direct injection engine with supercharger of the first aspect of the present invention, when fuel is injected during the intake stroke of the cylinder by the fuel injection valve to achieve a state of homogenous combustion in at least the supercharge region on the high-speed high-load side, the air-fuel ratio in the cylinder of the engine is enriched by the air-fuel ratio control means in a specific driving region in the supercharge region to inhibit an excessive rise in the exhaust temperature, while the intake air is further boosted by the supercharger and constricted to strengthen the flow within the cylinder to a maximum level and thus ensure maximum engine output while adequately vaporizing and atomizing the large amount of fuel, in order to reduce PM within the exhaust.

According to the second aspect of the invention, by increasing the boost pressure in the specific driving region in order to compensate the drop in intake efficiency due to the constriction of the intake air, it is possible to maintain maximum engine output and inhibit fluctuations in engine output.

According to the third aspect of the invention, by minimizing the amount of constriction on the intake air in at least the supercharge region aside from the specific driving region, it is possible to reduce pumping loss in the supercharge region and improve fuel consumption efficiency.

According to the fourth aspect of the invention, it is possible to reliably strengthen the flow within the cylinder by closing the flow control valve disposed in the intake passage to the cylinder to constrict the intake air.

According to a fifth aspect of the invention, in a so-called air guide direct injection engine, which requires a flow control valve in order to strengthen the tumble flow during stratified combustion, the flow control valve can be effectively utilized to adequately attain the effect of the fourth embodiment without an accompanied increase in costs or a complication of the structure.

Also, according to the sixth and seventh aspects of the invention, the same effects as in the first and second aspects of the invention, respectively, can be obtained.

DESCRIPTION OF THE PREFERRED EMBODIMENTS

Hereinafter, embodiments of the present invention are described with reference to the drawings.

Figure 1:
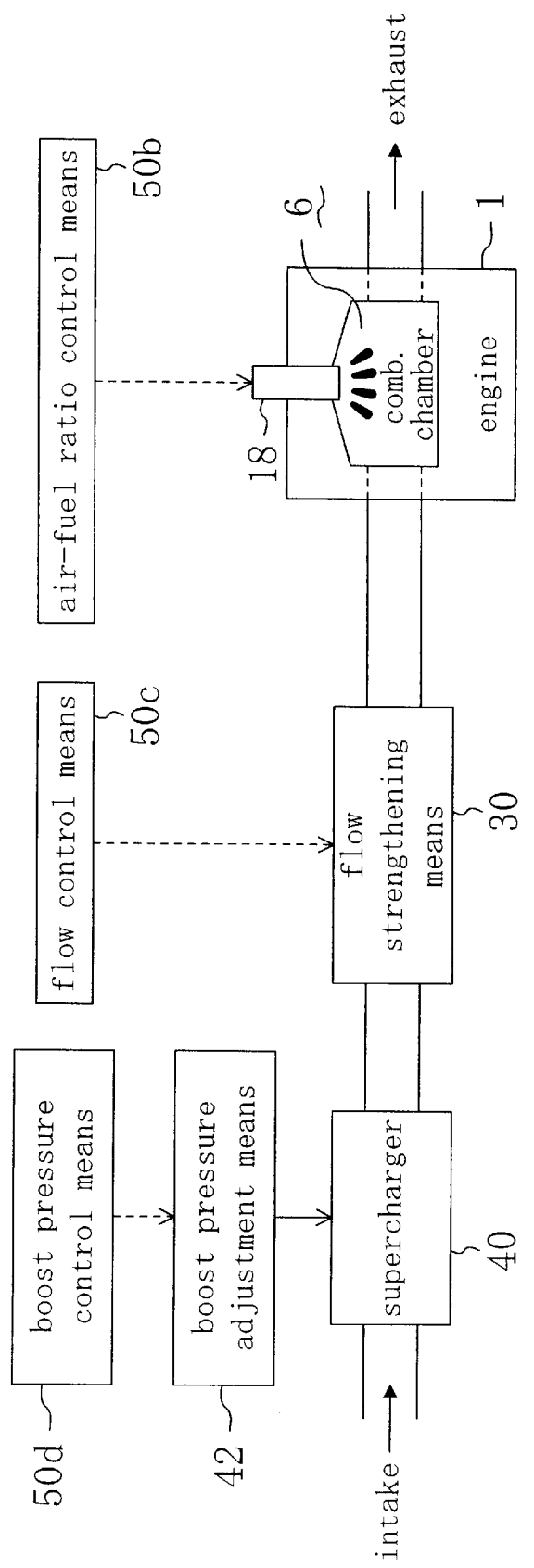
FIG. 1 is a diagram showing a schematic configuration of the present invention.
Figure 2:
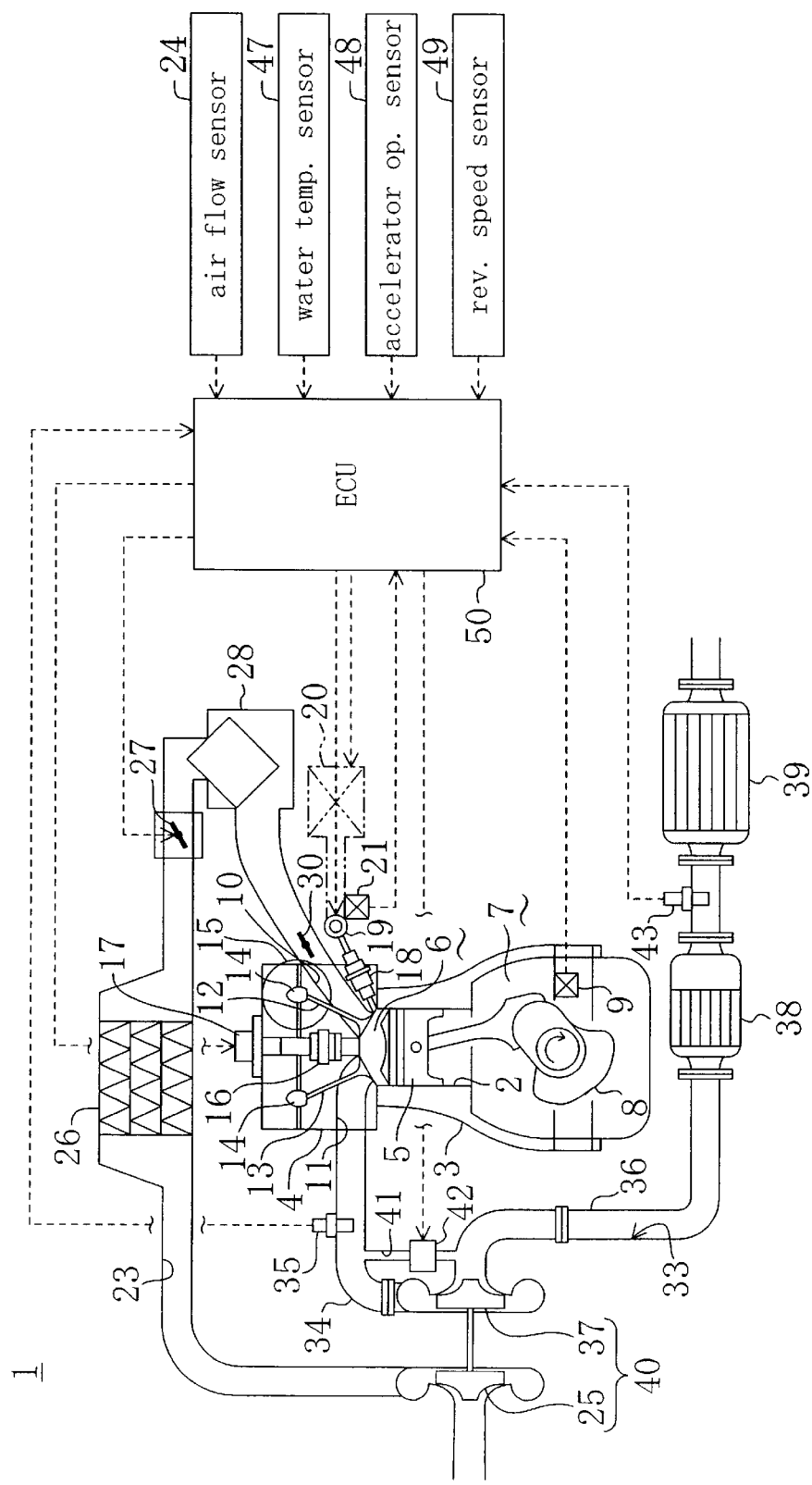
FIG. 2 is an overall structural diagram of the spark-ignition direct injection engine with supercharger according to the embodiment.

FIG. 2 shows the overall configuration of a spark-ignition direct injection engine 1 according to an embodiment of the present invention. The engine 1 has a cylinder block 3 in which a plurality of cylinders 2, 2, . . . (only one is shown) are provided in a row, a cylinder head 4 is disposed on the cylinder block 3, a piston 5 is mounted in each cylinder 2 such that it can move up and down, and a combustion chamber 6 is partitioned and formed in the cylinders 2 between the top surface of the piston 5 and the bottom surface of the cylinder head 4. Also, although not shown in the drawing, a water jacket is formed on the lateral wall portion of the cylinder block 3 that encloses the cylinders 2, 2, . . . , a crank chamber 7 is formed in the lower side portion of the cylinder block 3 such that it is in communication with the cylinders 2, 2, . . . , and a crankshaft 8 is accommodated within the crank chamber 7. An electromagnetic crank angle sensor 9 for detecting the turning angle of the crankshaft 8 is disposed within the crank chamber 7 and corresponds to an end of the crankshaft 8.

Figure 3:
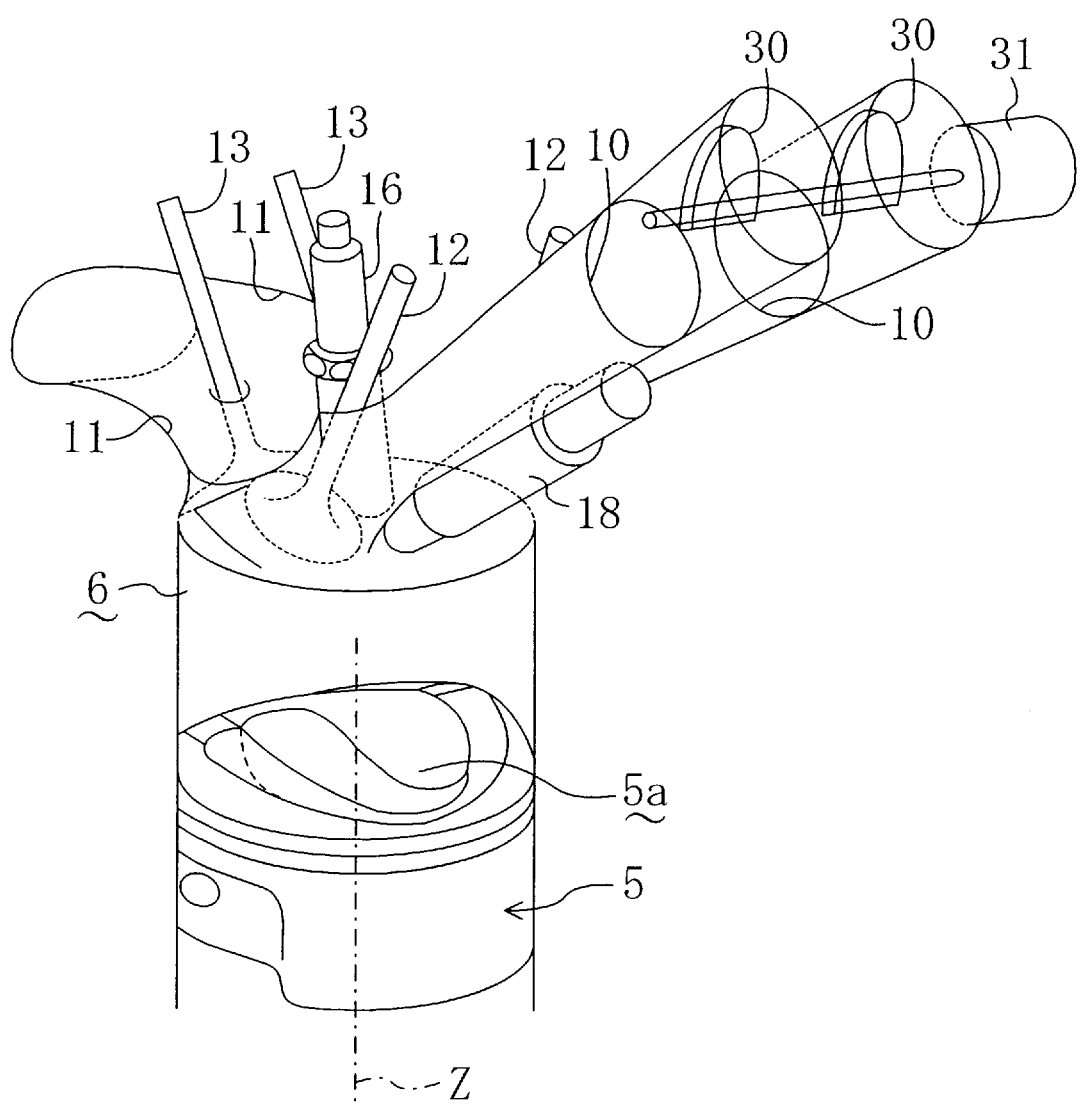
FIG. 3 is a perspective view showing the arrangement of the piston top surface, the intake port, the spark plug, and the injector.

FIG. 3 shows a magnification of one of the cylinders 2. Two sloped surfaces are formed in the ceiling portion of the combustion chamber 6 and lean against each other to form a roof-like shape. There are two intake ports 10 and two exhaust ports 11 that open in the sloped surfaces, and intake valves 12, 12 and exhaust valves 13, 13 are arranged at the edge of these openings. The two intake ports 10, 10 extend from the combustion chamber 6 in a straight line obliquely upward and open independent of one another on a lateral surface of the engine 1 (right side surface in FIG. 2), whereas the two exhaust ports 11, 11 converge into one at an intermediate portion and extend substantially horizontally to open up on the other lateral surface of the engine 1 (left side surface in FIG. 2).

The intake valves 12 and the exhaust valves 13 are opened and closed at a predetermined timing for each cylinder 2 by the crankshaft 8 rotatably driving two camshafts 14, 14 (shown only in FIG. 2) disposed in the cylinder head 4 via a timing belt. A variable valve operating mechanism 15 well known in the art is attached to the camshaft 14 on the intake side and continuously changes its rotational phase with respect to the crankshaft 8 within a predetermined angle range, and also changes the timing at which the intake valves 12 are opened and closed.

Figure 12:
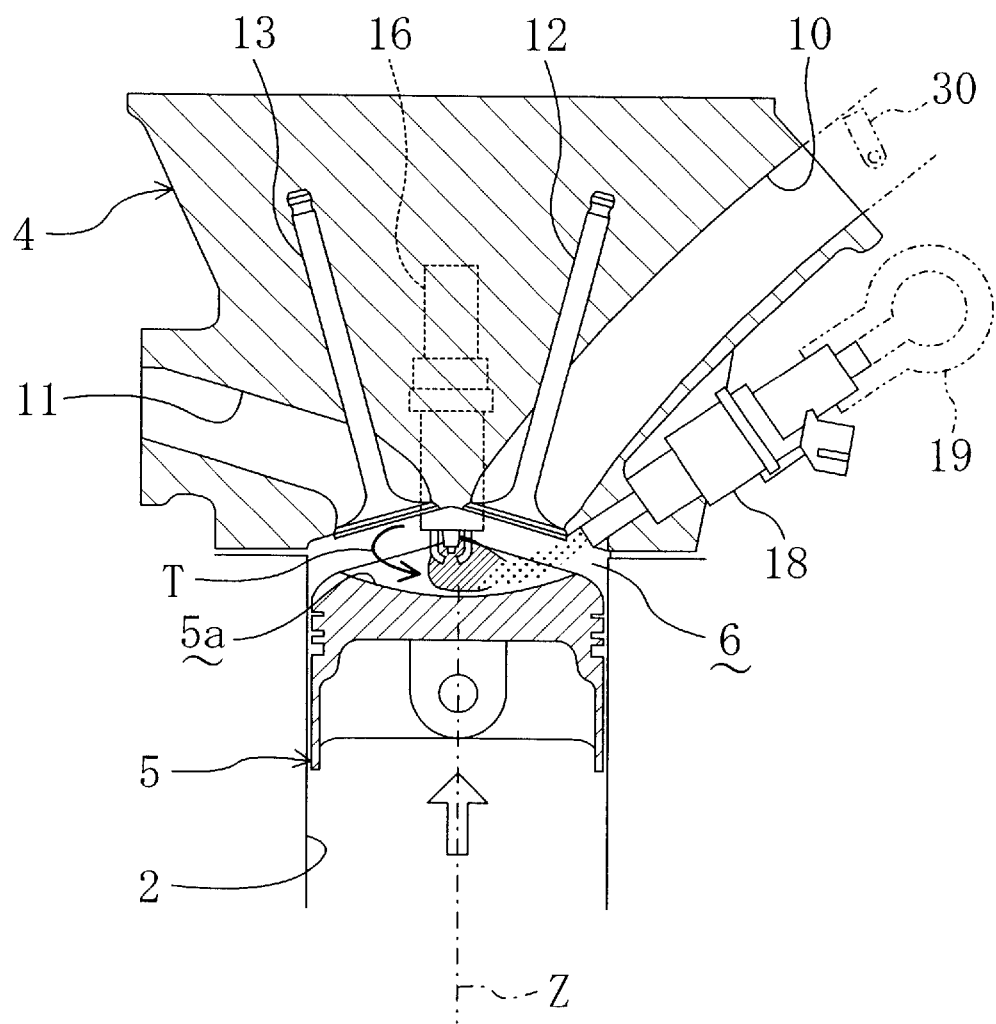
FIG. 12 is an explanatory diagram showing how the air-fuel mixture stays near the electrode of the spark plug during the spark period of the cylinder.
Figure 13:
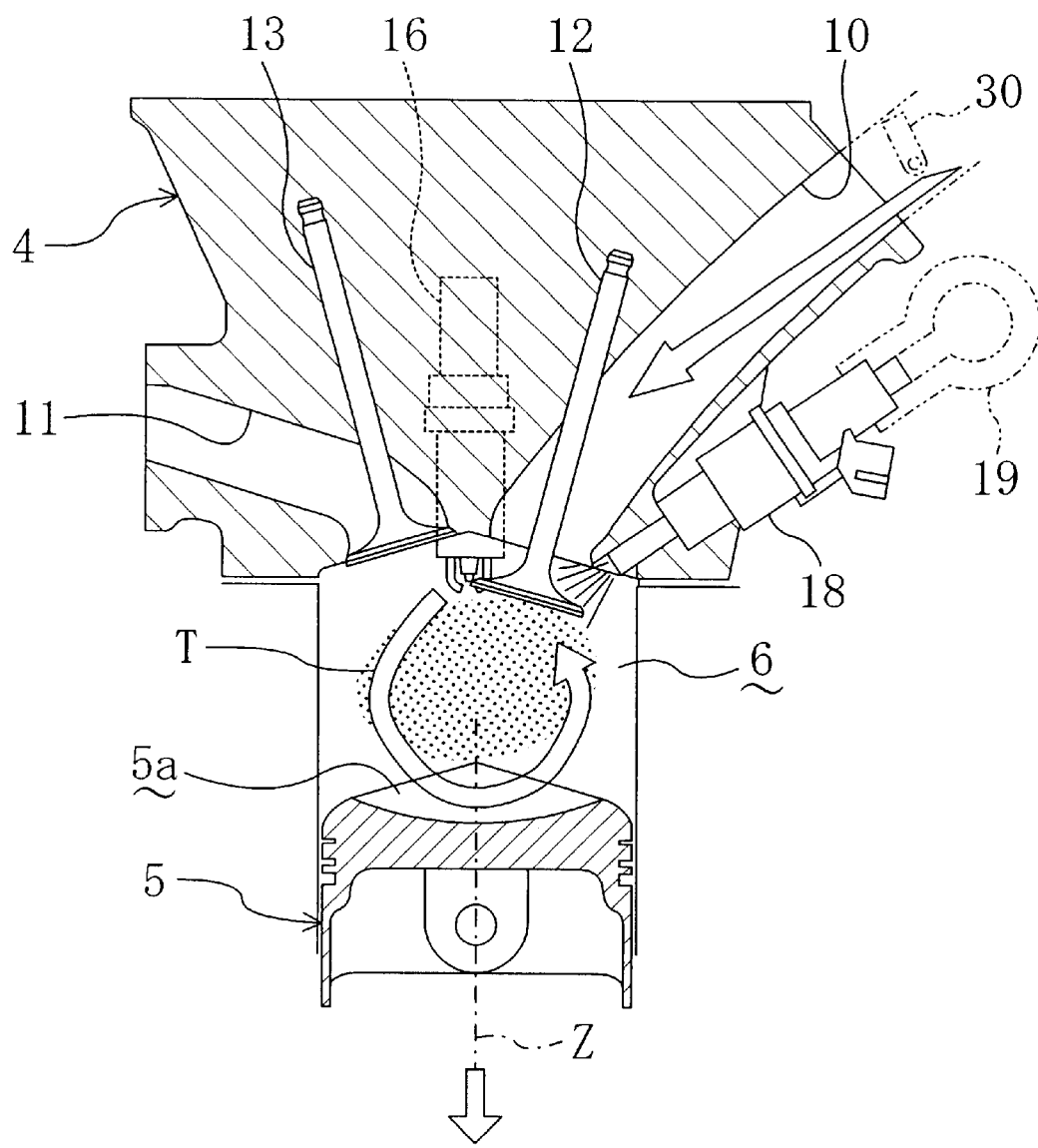
FIG. 13 is a diagram showing the tumble flow created in the combustion chamber and the fuel spray from the injector during the intake stroke of the cylinder.

A spark plug 16 is disposed above the combustion chamber 6 of each cylinder 2 and is surrounded by the four intake and exhaust valves 12 and 13. The electrode at the end of the spark plug 16 is positioned protruding by a predetermined distance from the ceiling portion of the combustion chamber 6 (see FIG. 12), so that it can be reliably fired against an air-fuel mixture in a substantially central portion of the combustion chamber 6 when the engine 1 is in a state of stratified combustion. Furthermore, a ignition circuit 17 (shown only in FIG. 2) is connected to the base end portion of the spark plug 16, and delivers electricity to the spark plug 16 at a predetermined ignition timing for each cylinder 2.

Furthermore, a lemon-shaped cavity 5a is formed in the substantially central portion of the top surface of the piston 5, which corresponds to the bottom portion of the combustion chamber 6, from the intake side to the exhaust side. Although explained in greater detail later, the tumble flow T that is created during the intake stroke of the cylinder 2 flows smoothly along the cavity 5a and is held until midway during the compression stroke of the cylinder 2, and stably flows toward an injector 18 such that it envelops the fuel spray from the injector 18 (see FIG. 11).

The injector (fuel injection valve) 18 is disposed at the edge of the combustion chamber 6 on the intake side and below the two intake ports 10, 10 such that it is sandwiched therebetween. The injector 18 is a swirl injector well known in the art, which sprays fuel in a rotating current from a nozzle hole formed in its end in order to inject fuel in a hollow cone-shape along the direction of its center axis, and angled such that at the moment of fuel injection to the cylinder 2, the fuel spray is substantially opposed to and collides with the tumble flow T that flows along the cavity 5a in the top surface of the piston 5 (see FIG. 11). It should be noted that the fuel injection valve is not limited to the swirl type injector mentioned above, and a variety of other injectors, including a slit type injector, a multi injection hole type injector, and an injector that employs a piezoelement, may also be used.

According to the arrangement of the spark plug 16 and the injector 18, when the engine 1 is operating in a state of low-speeds and low-loads, the behavior of the fuel spray that is injected from the injector 18 during the compression stroke of the cylinders 2 is controlled by the tumble flow T, and is suitably stratified near the electrode of the spark plug 16 to achieve a favorable state of stratified combustion. That is, the engine 1 is a so-called air-guided direct injection engine, in which the fuel spray is stratified by the flow within the cylinder.

As mentioned above, the injectors 18, 18 . . . that are disposed for the cylinders 2 are connected to a fuel distribution line 19 that is shared by all of the cylinders 2, 2, . . . , and high pressure fuel that is supplied from a fuel supply system 20 is distributed to each of the cylinders by way of the fuel distribution line 19. Although not shown, the fuel supply system 20 is provided with a fuel pump and a fuel pressure regulator, and both supplies fuel from the fuel tank to the fuel distribution line 19 and adjusts the fuel pressure of the fuel to match the driving state of the engine 1. The fuel distribution line 19 is also provided with a fuel pressure sensor 21 for detecting the fuel pressure therein.

As shown in FIG. 2, an intake passage 23 that is in communication with the intake ports 10, 10 of the cylinders 2 is connected to a lateral surface of the engine 1. The intake passage 23 supplies intake air, which has been filtered by an air cleaner located outside the drawing, to the combustion chambers 6 in the engine 1, and is provided, in order from its upstream side to its downstream side, with a hot wire-type air flow sensor 24 that detects the mass of intake air into the engine 1, a compressor 25 that is driven by a turbine 37, which is described later, and compresses the intake air, an intercooler 26 that cools the intake air that has been compressed by the compressor 25, an electric throttle valve 27, which is made of a butterfly valve and constricts the air intake passage 23, and a surge tank 28. The electric throttle valve 27 is not mechanically linked to the accelerator pedal outside the drawing, and is driven by an electric motor not shown in the drawing so that it is opened and closed to an opening that is appropriate for the operation to the accelerator pedal (accelerator opening).

The intake passage 23 on the downstream side of the surge tank 28 branches into independent routes for each cylinder 2, and the downstream end portion of each of these independent routes is further split in two, respectively in communication with one of the intake ports 10, 10. As shown in FIG. 3, flow control valves 30, 30 (Tumble Swirl Control Valve; hereinafter, abbreviated as TSCV) for adjusting the strength of the tumble flow T in the combustion chambers 6 and the swirl are provided on the upstream side of the two intake ports 10, 10, and are switched by an actuator such as a stepping motor 31. The TSCVs 30 are circular butterfly valves in which the portion below a valve shaft 30a has been cut away, and even when completely closed allow intake air to circulate through the cutaway portion and create a strong tumble flow T in the combustion chambers 6. On the other hand, when the TSCVs 30 are open, intake air is able to circulate not only through the cutaway portion, which gradually diminishes the strength of the tumble flow T.

It should be noted that the shape of the intake ports 10 and the TSCVs 30 is not limited to the above, and for example the TSCVs 30 may be butterfly valves that are cutaway in a portion above the valve shaft. The intake ports may also be a so-called common port in which two ports merge on the upstream side, in which case the TSCV may be a butterfly valve whose shape corresponds to the cross section shape of the common port and from which a portion has been cut away.

As shown in FIG. 2, an exhaust passage 33 for discharging burned gas (exhaust) from the combustion chambers 6 is connected to the other lateral surface of the engine 1. The upstream end of the exhaust passage 33 is configured by an exhaust manifold 34 that branches to each cylinder 2 and is in communication with the exhaust ports 11. A linear $O_2$ sensor 35 for detecting the oxygen concentration in the exhaust is disposed at the portion where the exhaust manifold 34 converges. The linear $O_2$ sensor 35 is employed to detect the air-fuel ratio based on the oxygen concentration in the exhaust, and provides linear output for oxygen concentration in a specific air-fuel ratio range that includes the theoretical air-fuel ratio.

A turbine 37, which is rotated by the exhaust flow, and an exhaust pipe 36 are connected to the exhaust passage 33 downstream from where the exhaust manifold 34 converges. A three-way catalyst 38, which is for purging HC, CO, and $NO_x$ in the exhaust substantially near the theoretical air-fuel ratio, and a so-called lean $NO_x$ catalyst 39, which is capable of purging $NO_x$ in exhaust leaner than the theoretical air-fuel ratio, are disposed in that order from the upstream to downstream side of the exhaust pipe 36.

Together with the compressor 25 of the intake passage 23, the turbine 37 constitutes a turbocharger 40. When the turbine 37 is rotated by the flow of the exhaust, the compressor 25 rotates together with the turbine 37 in a single unit to compress and supercharge the intake air. The turbocharger 40 is provided with a wastegate duct 41 guide exhaust from the upstream side to the downstream side of the exhaust pipe 36 bypassing the turbine 37, and a wastegate valve (relief valve) 42 for adjusting the volume of exhaust that is guided through the wastegate duct 41. Although not shown, the wastegate valve 42 adjusts the opening degree of the spool by the balance between the boost pressure drawn in from the intake passage 23 by way of the pilot duct, the coil spring bias, and the drive force generated by the electromagnetic solenoid, in order to maintain the boost pressure of the intake passage 23 at or below a preset maximum boost pressure (target boost pressure). The wastegate valve 42 can also linearly change and adjust the maximum boost pressure by changing the drive force of the electromagnetic solenoid. The wastegate valve 42 constitutes a boost pressure adjustment means for keeping the boost pressure on the intake air due to the turbocharger 40 at or below the maximum boost pressure.

The numeral 43 shown in FIG. 2 is a lambda $O_2$ sensor that is disposed on the downstream side of the three-way catalyst 38 and is for assessing the state of deterioration of the three-way catalyst 38. Also, although not shown in the drawings, the upstream end of an EGR duct for returning a portion of the exhaust to the air intake side is branched and connected to a site on the exhaust passage 33 more upstream than the turbine 37. The downstream end of the EGR duct is connected to the surge tank 28, near which is disposed an electric EGR valve capable of adjusting the opening degree of the EGR duct and the volume of return flow exhaust therethrough.

Engine Combustion State Control

The variable valve operating mechanism 15, the ignition circuit 17, the injector 18, the fuel supply system 20, the electric throttle valve 27, and the TSVCs 30, among others, are operated and controlled by an engine controller 50 (hereinafter, referred to as ECU). Furthermore, output signals from at least the crank angle sensor 9, the fuel pressure sensor 21, and the air flow sensor 24, for example, are input to the ECU 50. Signals that are output from a water temperature sensor 47, which faces the water jacket of the cylinder block 3 and detects the temperature of the coolant (engine water temperature), and moreover signals that are output from an accelerator opening sensor 48, which detects the opening degree of the accelerator, and from a revolution speed sensor 49, which detects the revolution speed of the engine 1 (the revolution speed of the crankshaft 8), are input to the ECU 50.

Based on the signals input from these sensors, the ECU 50 controls the timing of the switching operation of the intake and the exhaust valves 12 and 13, the ignition timing of the spark plug 16, the fuel injection volume, the injection timing, and the injection pressure by the injector 18, the volume of intake air adjusted by the throttle valve 27, and the strength of the tumble flow T adjusted by the TSCVs 30, for example, in order to match each of these to the driving conditions of the engine 1.

Figure 4:
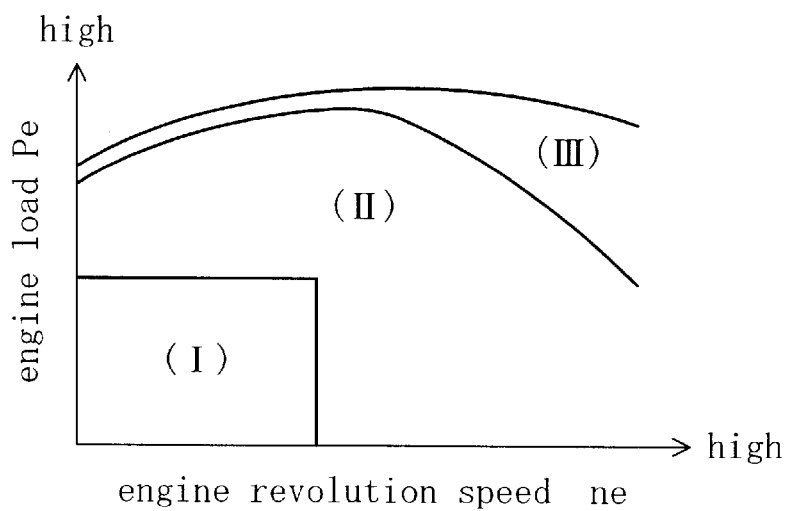
FIG. 4 is a diagram showing an example of a control map that establishes the driving modes of the engine.
Figure 5:
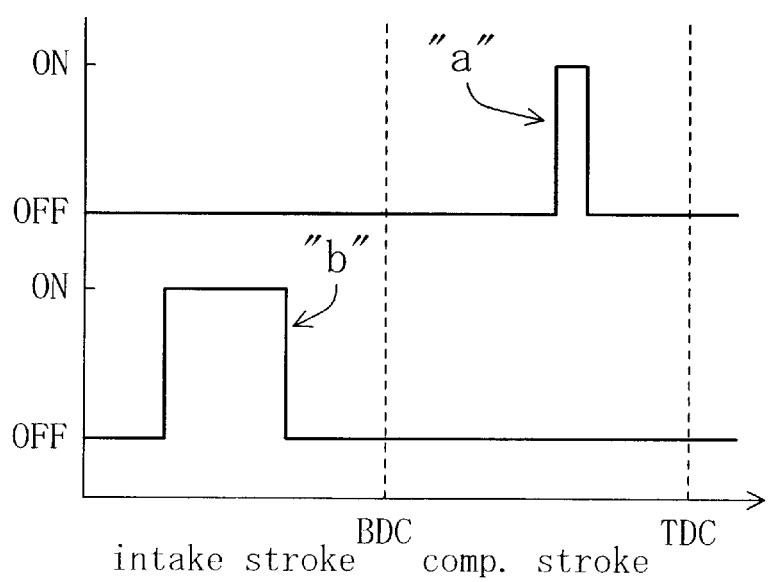
FIG. 5 is a time chart that schematically shows the fuel injection timing of the injector.

More specifically, as shown illustratively in FIG. 4, in a warm engine 1, a predetermined drive region (I) on the low-speed low-load side is designated as a stratified combustion region. As schematically shown by "a" in FIG. 5, in the stratified combustion region (I), fuel is injected by the injector 18 during the compression stroke of the cylinders 2 to attain a state of stratified combustion in which the air-fuel mixture near the electrode of the spark plug 16 is combusted unevenly in layers. Also, in this region (I), the throttle valve 27 is opened relatively widely in order to reduce pumping loss, and the average air-fuel ratio in the combustion chambers 6 at this time is significantly leaner than the theoretical air-fuel ratio (A/F≈14.7).

The region other than the stratified combustion region (I) is known as a homogenous combustion region. As shown schematically by "b" in FIG. 5, fuel is injected by the injector 18 during the intake stroke of the cylinders 2 to form a uniform air-fuel mixture in the combustion chambers 6, which is then combusted. Most of the homogenous combustion region is a λ=1 region (II), in which the volume of injected fuel and the opening degree of the throttle, for example, are controlled so that the air-fuel ratio of the mixture in the cylinders 2 is substantially the theoretical air-fuel ratio. Also, in the low-speed max-load and high-speed high-load enriched region (III), the air-fuel ratio is either a so-called power air-fuel ratio (A/F≈13) or richer than the power air-fuel ratio, so as to obtain a large output to match the high-load.

Figure 7:
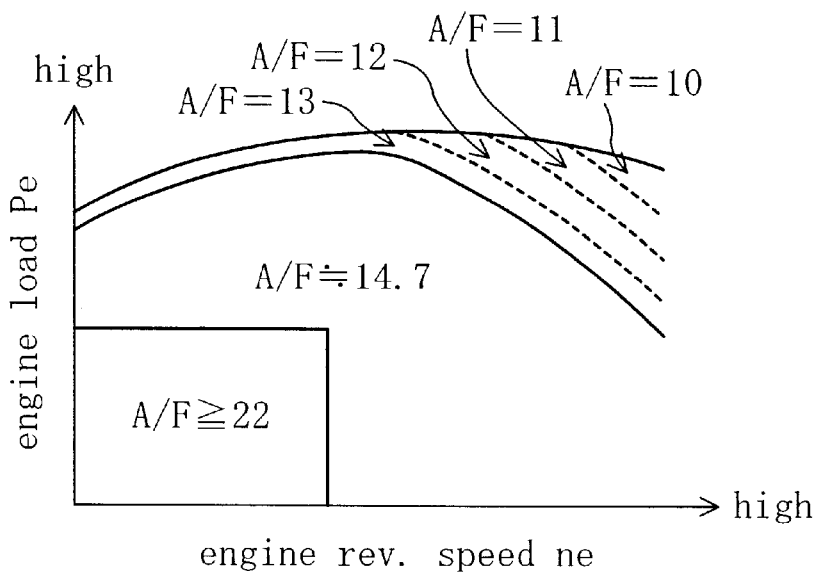
FIG. 7 is a diagram showing an example of an air-fuel ratio map, in which the value of the target load and the value of the target air-fuel ratio suited for the engine revolution speed are set and recorded.

Particularly in the driving region (hereinafter, referred to as the specific region) on the high-speed side (for example, 4000 RPM or more) of the enriched region (III), the higher the speed or the higher the load, the richer the air-fuel ratio of the mixture becomes, so that the exhaust temperature is kept from rising due to the latent heat of excess fuel (see FIG. 7). This particular aspect is a characteristic of the present invention. Moreover, the maximum boost pressure of the turbocharger 40 is increased in the specific region in order to achieve good combustion of the large volume of fuel that is injected and supplied, as will be described later, and the TSCVs 30 are closed in order to maximize the strength of the tumble flow T.

Although not explicitly shown, in the driving region spanning from the high speed side (for example, 1500 RPM or more) of the stratified combustion region (I) to the λ=1 region (II) and the enriched region (III), the volume of exhaust exceeds a certain level and the intake air is substantially boosted by the turbocharger 40. Hereinafter, this region may also be referred to as the supercharge region.

The procedure of the control by the ECU 50 is described in detail below. As shown by the flow chart of FIG. 6, first, in step SA1 after the start, signals output from the crank angle sensor 9, the air flow sensor 24, the water temperature sensor 47, the accelerator opening sensor 48, and the revolution speed sensor 49, for example, are input to the ECU 50. Next, in step SA2, the ECU 50 calculates the target load Pe of the engine 1 based on the engine revolution speed ne, which is detected by a revolution speed sensor 52, and the opening degree of the accelerator, which is detected by an accelerator opening sensor 51. Based on the target load Pe that is calculated and the engine revolution speed ne, the ECU 50 reads the driving mode of the engine 1 from a control map such as the one shown in FIG. 4 and thereby determines the driving mode.

It should be noted that the optimal values of the target load value Pe corresponding to the opening degree of the accelerator and the engine revolution speed ne are found experimentally in advance and recorded as a map. This map is stored electronically in the memory of the ECU 50, and the values corresponding to the current opening degree of the accelerator and the engine revolution speed ne are read out from the map.

Next, in each of the following steps starting from step SA3, the control parameters for each driving mode established in step SA2 are calculated, and based on the results of this calculation, the ignition circuit 17, the injector 18, the throttle valve 27, and the TSCVs 30, for example, are operated. That is, in step SA3, if it is determined that the engine 1 is not in the stratified combustion mode, then the procedure advances to step SA7, which is described later. However, if it is determined that the engine 1 is in the stratified combustion mode, then the procedure advances to steps SA4 to SA6, and the control for the stratified combustion mode is performed.

More specifically, if the engine 1 is in the stratified combustion mode, then first, in step SA4, the target air-fuel ratio A/F of the engine 1 is calculated based on the target load Pe and the engine revolution speed ne found in step SA2. That is, the optimal values of the target air-fuel ratio A/F corresponding to the target load Pe and the engine revolution speed ne are found in advance by experiment and recorded as an air-fuel ratio map such as the example shown in FIG. 7. This map is stored electronically in the memory of the ECU 50. Next, the value corresponding to the current target load Pe and the engine revolution speed ne is read out from the air-fuel ratio map based on the current target load Pe and the engine revolution speed ne.

Next, in step SA5, the injector 18 and the throttle valve 27, for example, are controlled to put the engine 1 in a state of stratified combustion. That is, the target fuel injection volume is calculated based on the target air-fuel ratio A/F found in step SA4 and the charging efficiency ce. Then, the open interval of the injector 18 (the pulse width) is calculated based on this target volume of fuel injection and the current fuel pressure. Here, the charging efficiency ce can be calculated based on the output from the air flow sensor 24 and the engine revolution speed ne, for example.

Also, the timing to initiate opening the injector 18 (fuel injection timing) and the timing of the spark by the spark plug 13 (ignition timing), for example, are calculated based on the target load Pe and the engine revolution speed ne. Furthermore, the target opening degree of the throttle valve 27 is calculated based on the target air-fuel ratio A/F and the engine revolution speed ne, and the target fuel pressure is calculated based on the engine revolution speed ne. Then, signals serving as operating commands are output from the ECU 50 to the ignition circuit 17, the injector 18, the fuel supply system 20, and the throttle valve 27, for example.

It should be noted that in calculating the various control parameters, it is possible to create a map in which the optimal values for the various control parameters are correlated to condition parameters representing the driving conditions of the engine 1, such as the target load Pe, the target air-fuel ratio A/F, and the revolution speed ne, and then established experimentally and recorded. This map can be stored electronically in the memory of the ECU 50, and from this map it is possible to read out the values for the various control parameters that correspond to the current driving conditions of the engine 1. Let us take the target fuel pressure as an example. Considering that the strength of the tumble flow T in the combustion chamber 6 changes with the engine revolution speed ne, the fuel pressure can be increased to correspond to that engine revolution speed ne and thereby increase the penetration of the fuel spray in correspondence to the increase in tumble flow speed that accompanies the rise in the engine revolution speed ne.

Figure 8:
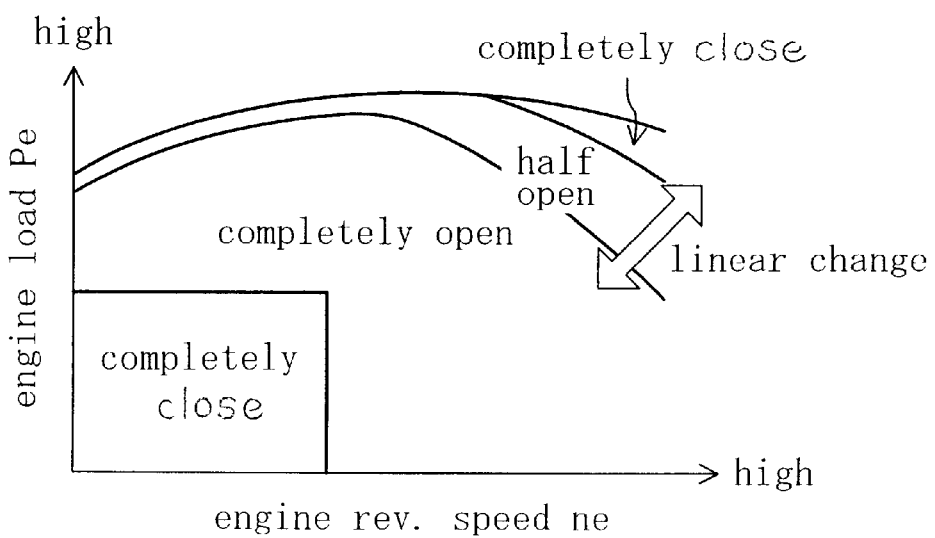
FIG. 8 is a diagram showing an example of a TSCV map, in which the target load and the TSCV opening suited for the engine revolution speed are set and recorded.

Next, in step SA6, the target opening degree of the TSCVs 30 (TSCV opening) is calculated based on the target load Pe and the engine revolution speed ne. More specifically, the optimal value of the TSCV opening corresponding to the target load Pe and the engine revolution speed ne is found by experiment in advance and recorded as a TSCV map like the example shown in FIG. 8. This map is stored electronically in the memory of the ECU 50, and the value for the TSCV opening that corresponds to the current target load Pe and the engine revolution speed ne is read out from the map. According to the TSCV map, the TSCVs are substantially completely closed in the stratified combustion region (I), and thus, as has originally been the case, the intake air can be constricted to strengthen the tumble flow T and balance it with the fuel spray, even in the low speed region of the engine 1, where there is a low flow speed of the intake air. Then, a command signal is output from the ECU 50 to the TSCVs 30, and the procedure returns.

To rephrase the above, in the stratified combustion mode, first a preliminary fuel injection volume with which the required output can be obtained is determined and then used to determine the air-fuel ratio, the opening degree of the throttle is controlled to obtain the mass of intake air needed for this air-fuel ratio, and ultimately the volume of injected fuel is controlled in accordance with the actual volume of intake air. Thus, excellent drivability and fuel economy can be attained without compromising the condition of the exhaust.

On the other hand, if it is determined in step SA3 that the engine is not in the stratified combustion mode and the procedure advances to step SA7, then it is determined whether the engine is in the enriched mode. If this is determined to be yes, then the procedure advances to step SAI1, which is described later, and if it is determined to be no, then the engine is in the $\lambda=1$ mode and the procedure advances to step SA8, where the target air-fuel ratio A/F of the engine 1 is taken as the theoretical air-fuel ratio. Then, in step SA9, as in step SA5, the target fuel injection volume and the pulse width of the injector 18 are calculated, the target fuel pressure is calculated based on the engine revolution speed ne, the fuel injection timing and the ignition timing are calculated based on the charging efficiency ce and the engine revolution speed ne, and the target opening of the throttle valve 27 is calculated based on the opening degree of the accelerator. Signals serving as operating commands are then output from the ECU 50 to the ignition circuit 17, the injector 18, the fuel supply system 20, and the throttle valve 27, for example.

Next, in step SA10, as in step SA6, the TSCV opening is read from the TSCV map based on the target load Pe and the engine revolution speed ne, a signal serving as an operating command is output to the TSCVs 30, and then the procedure returns. According to this map, in the $\lambda=1$ region (II) the TSCVs are substantially completely open, thus minimizing the drop in air intake efficiency and reducing pumping loss, so that a reduction in fuel consumption can be achieved in the $\lambda=1$ region (II).

To rephrase the above, the underlying premise in the $\lambda=1$ mode is to bring the air-fuel mixture substantially to the theoretical air-fuel ratio. To that end, the opening degree of the throttle is controlled so that the required output, that is, the required volume of the air-fuel mixture, is obtained and the volume of fuel injection is controlled to correspond to the actual amount of intake air, so that sufficient power and superior drivability are achieved while the exhaust can be substantially completely purified by the three-way catalyst 38.

The present invention is characterized in how the control is performed in the enriched mode, as explained below. In step SA7, when it is determined that the engine is in the enriched mode and the procedure advances to step SA11, first, in step SA11, as in step SA4, the target air-fuel ratio A/F of the engine 1 is read from the air-fuel ratio map based on the target load Pe and the engine revolution speed ne. Here, according to the air-fuel ratio map, the target air-fuel ratio A/F on the low-speed side (4000 RPM or less in the drawing) of the enriched region (III) is the so-called power air-fuel ratio (A/F≈13), where the highest output can be attained during homogenous combustion.

On the other hand, the air-fuel ratio A/F in the specific region on the high speed side (in the drawing, the region of more than 4000 RPM) of the enriched region (III) is established within a range of A/F≈10 to 13 so that the higher the speed or the higher the load, the richer the value. Thus, when the engine 1 is in the specific region, the air-fuel ratio A/F of the air-fuel mixture within the cylinders 2 is A/F≦13, so that a sufficiently high output to correspond to the high load is achieved. The air-fuel ratio is gradually changed so that it becomes richer as the speed and/or the load increases. This increases the ratio of the volume of injected fuel to intake air and thus the temperature of the exhaust is kept from rising due to the latent heat of the large volume of fuel that is injected and supplied.

Next, in step SA12, the target fuel injection volume is calculated based on the target air-fuel ratio A/F and the charging efficiency ce, and then the pulse width of the injector 18 is calculated based on this target fuel injection volume and the current fuel pressure. Also, the target fuel pressure is calculated based on the engine revolution speed ne, the fuel injection timing and the ignition timing are calculated based on the charging efficiency ce and the engine revolution speed ne, and the target opening of the throttle valve 27 is calculated based on the opening degree of the accelerator. Signals serving as operating signals are then output from the ECU 50 to the ignition circuit 17, the injector 18, the fuel supply system 20, and the throttle valve 27, for example.

Next, in step SA13, as in steps SA6 and SA10, the TSCV opening degree is read from the TSCV map based on the target load Pe and the engine revolution speed ne, and a signal is output to the TSCVs 30 to control their action. This TSCV map establishes that in the low-speed side of the enriched region (III) the TSCVs 30 are substantially half closed, whereas in the high-speed side (specific region) of the enriched region (III), the TSCVs are anywhere from substantially completely open to completely closed, with the opening degree becoming smaller the more the engine is on the high-speed side high-load side. That is, the opening degree of the TSCVs in the specific region is controlled so that the amount of constriction on the intake air is relatively large compared to the λ=1 region, which is adjacent to the low-load side of the specific region, even when the engine revolution speed ne is the same.

Next, in step SA14, the setting for the maximum boost pressure of the turbocharger 40 is changed. More specifically, as shown in the example of in FIG. 9, a boost pressure table is electronically stored in the ECU 50. The boost pressure table establishes the opening degree of the wastegate valve 42 such that the maximum boost pressure gradually increases as the opening degree of the TSCVs decreases in a range spanning from completely closed to completely open. Put differently, first, when the TSCVs 30 are closed to increase the amount of constriction on the intake air, the maximum boost pressure that is capable of compensating the resultant drop in air intake efficiency and maintaining the charging efficiency of the cylinders 2 is found, and the opening degree of the wastegate valve 42 in order to achieve this maximum boost pressure is found experimentally and established as the boost pressure table. Next, the maximum boost pressure is read from the boost pressure table based on the TSCV opening degree found in step SA13, and a control signal is output to the electromagnetic solenoid of the wastegate valve 42 so that it is opened to a degree that corresponds to this maximum boost pressure. The procedure then advances to return.

Thus, the maximum boost pressure of the intake air due to the turbocharger 40 is higher in the specific region than in the λ=1 region, which is adjacent to the low-speed side of the specific region. Also, the TSCVs 30 and the wastegate valve 42 of the turbocharger 40 are controlled when the driving state of the engine 1 shifts between the specific region and other regions, at which time there are no abrupt changes to the charging efficiency of the cylinders 2 and fluctuations in engine output are inhibited.

To rephrase the above, when the engine 1 is in the enriched region (III), the air-fuel ratio is set to the so-called power air-fuel ratio in order to obtain high output, while combustion is controlled in essentially the same manner as in the λ=1 mode. In the specific region on the high-speed side of the enriched region, the air-fuel ratio is further enriched to keep the exhaust temperature from rising, and in order to sufficiently vaporize and atomize the extremely large volume of fuel that is injected for this purpose and achieve good fuel combustion, the boost pressure of the intake air is increased by the turbocharger 40 and the TSCVs 30 are closed to therefore constrict the intake air, which has the effect of maximizing the strength of the tumble flow T in the combustion chambers 6.

Figure 9:
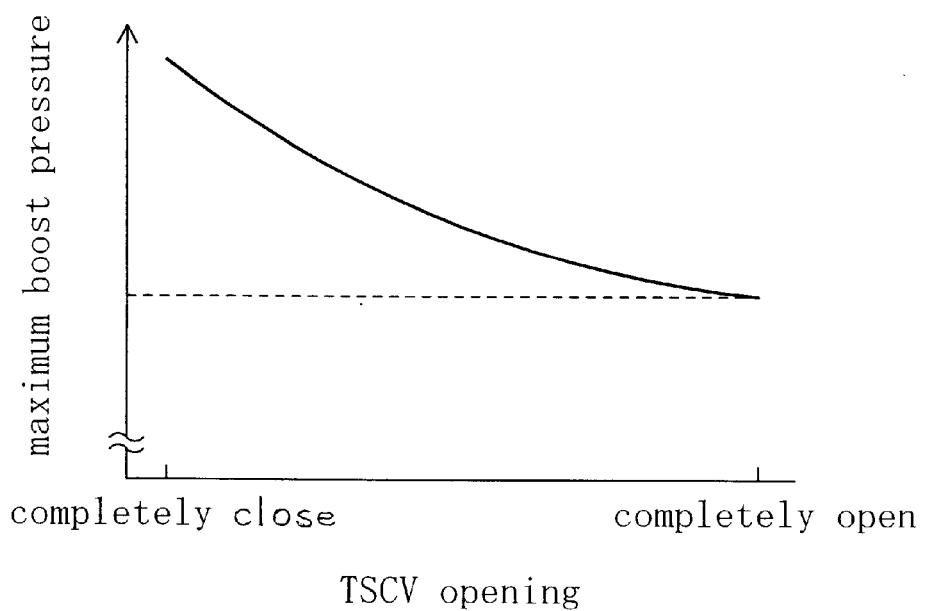
FIG. 9 is a diagram showing an example of a table that establishes the appropriate maximum boost pressure for the opening degree of the TSCV.

It should be noted that in step SA14 of the flowchart, the maximum boost pressure of the turbocharger 40 has been established to correlate to the degree of TSCV opening, as shown in FIG. 9. However, there is no limitation to this, and to achieve the same characteristics as in FIG. 9, it is also possible to correlate the maximum boost pressure to the target load Pe or to the engine revolution speed ne, for example, and plot and record this as a map that can be used to control the opening degree of the wastegate valve 42.

Because there are individual differences in the extent that the TSCVs 30 constrict the intake air, it is possible to amend the boost pressure table (see FIG. 9) based on the result of studying the correlation between the opening degree of the TSCVs and the actual charging efficiency ce during regular driving in the stratified combustion mode described above, for example. Moreover, the maximum boost pressure does not necessarily have to be changed in accordance with the change in the TSCV opening in order to maintain the intake efficiency, and it is possible to simply increase the maximum boost pressure in the specific region.

Figure 6:
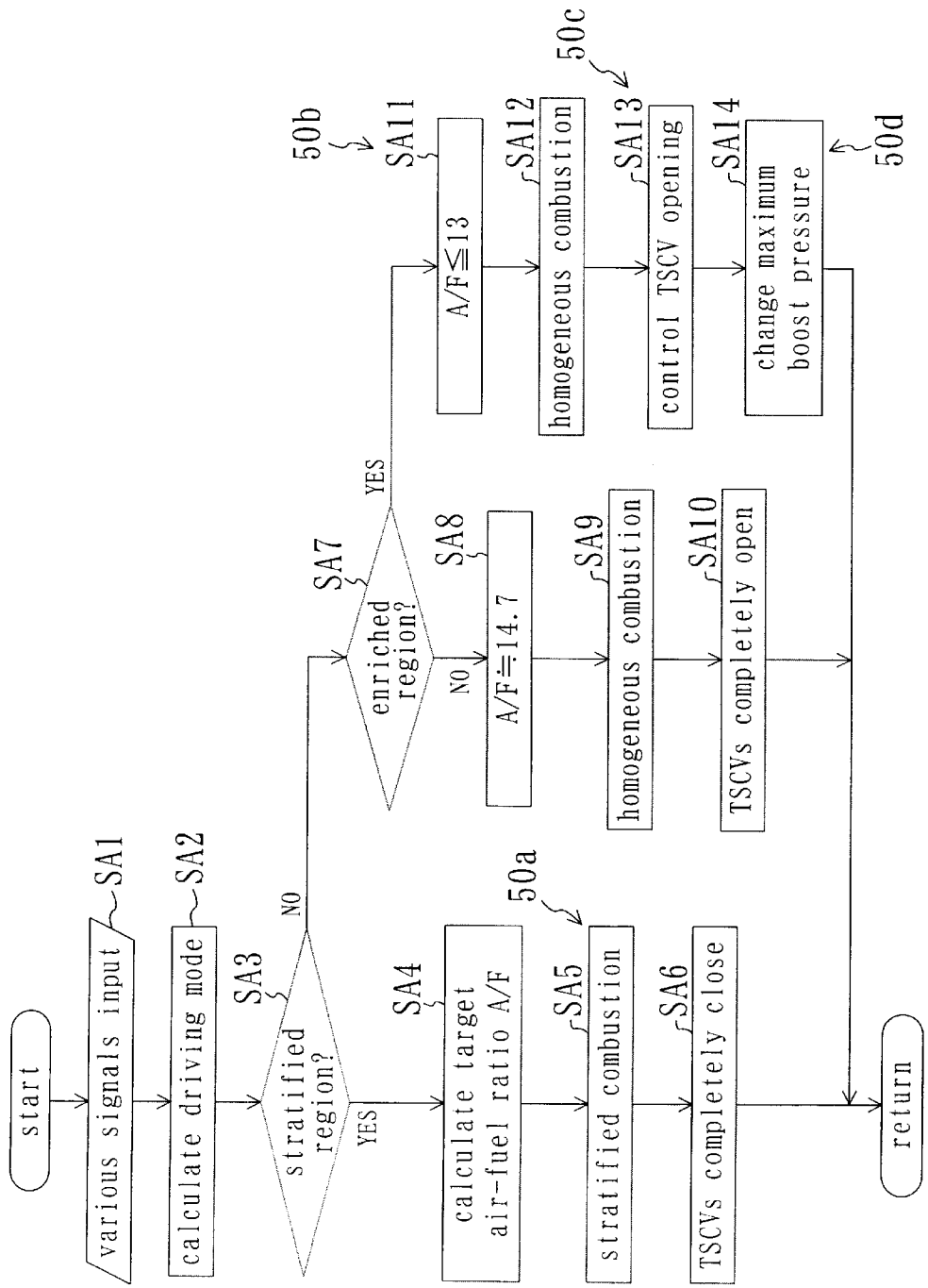
FIG. 6 is a flow chart showing the basic control procedure of the engine.

In the flowchart shown in FIG. 6, a fuel injection control means 50a is configured by step SA5, which in the low-speed low-load stratified combustion region (I) injects fuel from the injector 18 toward the tumble flow T during the compression stroke of the cylinder 2, so that the fuel injected by the injector 18 becomes a combustible air-fuel mixture in the ignition timing of the cylinder 2 and resides near the electrode of the spark plug 16.

An air-fuel ratio control means 50b is configured by step SA11, and controls the air-fuel ratio A/F in the cylinders 2 so that A/F≦13 in the specific region established on the high-speed high-load side of the enriched region (III).

A flow control means 50c is configured by step SA13 and increases the amount the intake air is constricted by the TSCVs 30, so that the tumble flow T is relatively stronger in the specific region than in the λ=1 region (II), which is adjacent to the low-load side of the specific region, even if the engine revolution speed ne is the same.

Furthermore, a boost pressure control means 50*d* is configured by step SA14 and controls the opening degree of the wastegate valve 42 of the turbocharger 40 so that the target boost pressure (maximum boost pressure) for keeping a constant boost pressure is higher in the specific region than in the λ=1 region (II), which is adjacent to the low-speed side of the specific region.

Driving Operation of the Engine 1

Hereinafter, the driving operation of the engine 1 according to this embodiment is described in detail.

Figure 10:
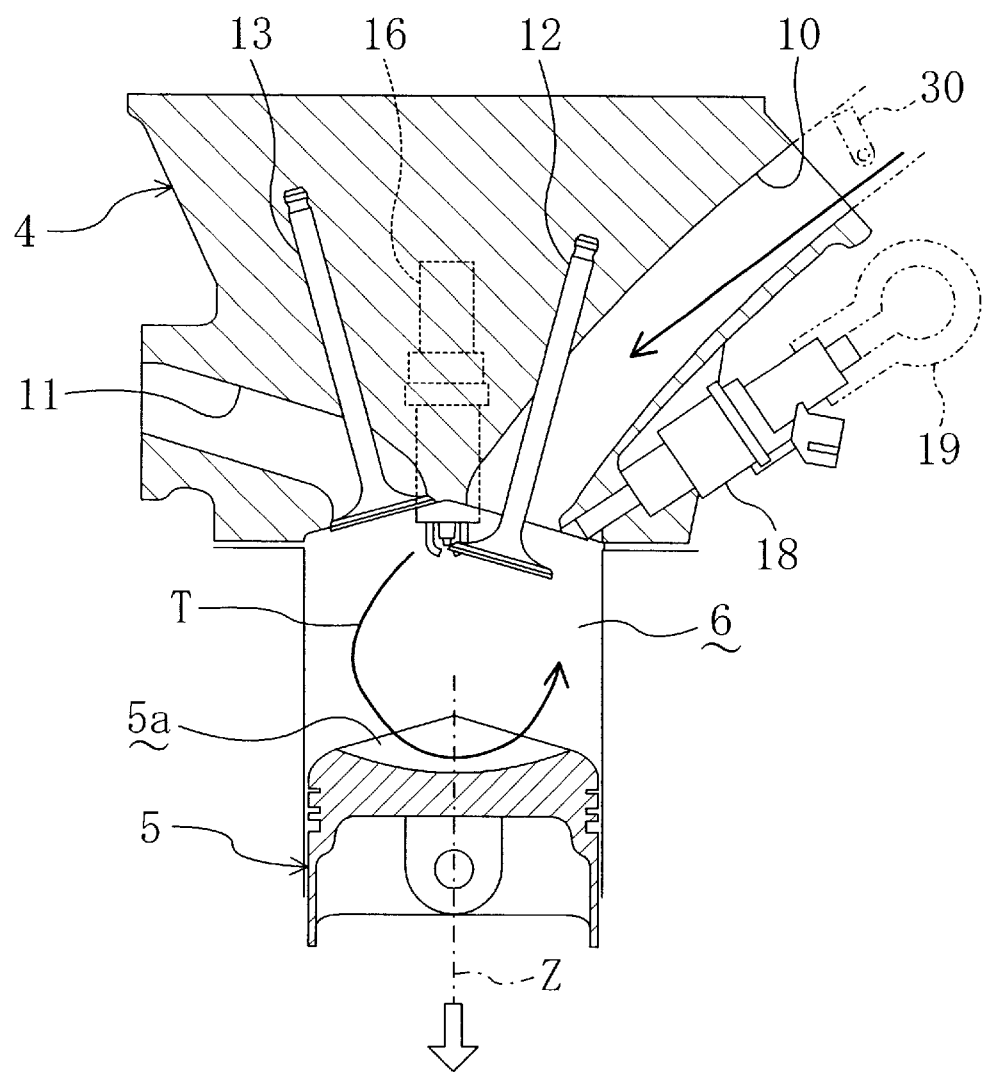
FIG. 10 is a diagram showing the tumble flow created in the combustion chamber during the intake stroke of the cylinder.
Figure 11:
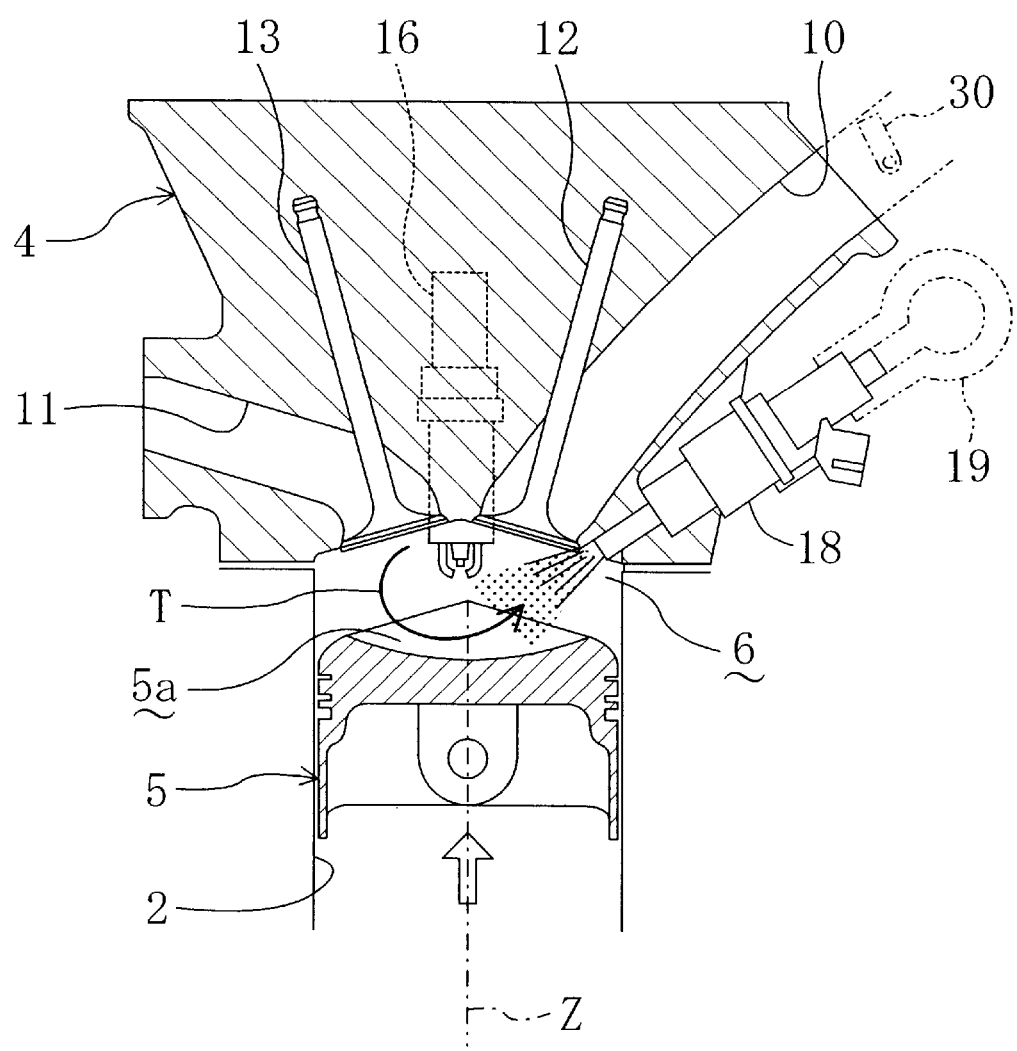
FIG. 11 is a diagram showing how the fuel spray is injected so as to collide with the tumble flow during the fuel injection period of the cylinder.

First, when the engine 1 is in the stratified combustion region (I), the intake air that flows into the combustion chamber 6 from the intake ports 10, 10 during the intake stroke of the cylinder 2 creates a tumble flow T as shown in FIG. 10. The tumble flow T, as shown in FIG. 11, is saved until the latter part of the compression stroke of the cylinder 2 and flows toward the injector 18 along the cavity 5*a* in the top surface of the piston 5. At this time, the tumble flow T is gradually destroyed and becomes compact as the piston 5 rises during the compression stroke. Although the speed of the tumble flow T is diminished, it is not eliminated until the latter part of the cylinder 2 compression stroke because a suitably shaped space is left between the ceiling portion of the pent-roof type combustion chamber 6 and the cavity 5*a* in the top surface of the piston 5.

Then, as shown in FIG. 11, the greater part of the fuel spray that is injected by the injector 18 collides substantially head-on with a spot where the flow of the tumble flow T flowing along the cavity 5*a* in the top surface of the piston 5 is strong. This promotes the vaporization and the atomization of the fuel drops and promotes the mixture of the fuel with the surrounding air, and the fuel spray pushes aside the tumble flow T as it advances while it is gradually reduced in speed and becomes a combustible air-fuel mixture in the spark period of the cylinders 2 as illustrated by the diagonal lines added in FIG. 12 and stays near the electrode of the spark plug 16. By sending electricity to the spark plug 16 in this state, the combustible air-fuel mixture layer is ignited.

That is, in the low-speed low-load stratified combustion region (I), the penetration of the fuel spray by the injector 18 is adjusted so that is corresponds to the speed of the opposing tumble flow T, and the fuel is injected at a predetermined timing counted backwards from the ignition timing of the cylinder 2, so that the penetration of the fuel spray and the tumble flow are balanced and the air-fuel mixture is suitably and stably stratified around the electrode of the spark plug 16, thus achieving good stratified combustion.

On the other hand, when the engine 1 is in the λ=1 region (II) or in the enriched region (III), a tumble flow T is created and fuel is injected by the injector 18 during the intake stroke of the cylinder 2. This injected spray disperses relatively widely in the low-pressure combustion chamber 6 compared to during the compression stroke, and disperses because of the increase in combustion chamber 6 volume as the piston 5 moves downward. Simultaneously, the fuel spray is sufficiently mixed with the intake air by the tumble flow T and is sufficiently vaporized and atomized, so that a substantially uniform combustible air-fuel mixture is formed in the entire combustion chamber 6. Then, when electricity is delivered to the electrode of the spark plug 16 in the subsequent ignition timing, the flame kernel created near the spark plug grows rapidly and a good state of homogenous combustion is achieved.

In particular, in the specific region on the high-speed side of the enriched region (III), the wastegate valve 42 is controlled to increase the maximum boost pressure of the turbocharger 40, so that maximum boosting can be performed to increase the mass of intake air into the cylinders 2 and a large volume of fuel can be injected from the injector 18 so that the air-fuel ratio A/F of the air-fuel mixture in the cylinders 2 becomes A/F≦13. At this time, the time interval during which fuel can be injected is shortened due to the rise in engine revolution speed ne, retarding the end of fuel injection. This results in very disadvantageous conditions for the vaporization and the atomization of the fuel. However, even though maximum boosting is being carried out as described above, closing the TSCVs 30 to constrict the air intake has the effect of strengthening the tumble flow T in the combustion chamber 6 as much as possible due to the combined action between it and the high boost pressure, and thus the large volume of injected fuel is sufficiently vaporized and atomized so that PM created together with combustion can be sufficiently inhibited.

Moreover, as explained above, the maximum boost pressure of the turbocharger 40 is increased in order to compensate the drop in intake efficiency caused by closing the TSCVs 30, and thus maximum output of the engine 1 is maintained and fluctuation in the output does not occur, even when the driving state of the engine 1 shifts between the specific region and other regions.

Figure 14:
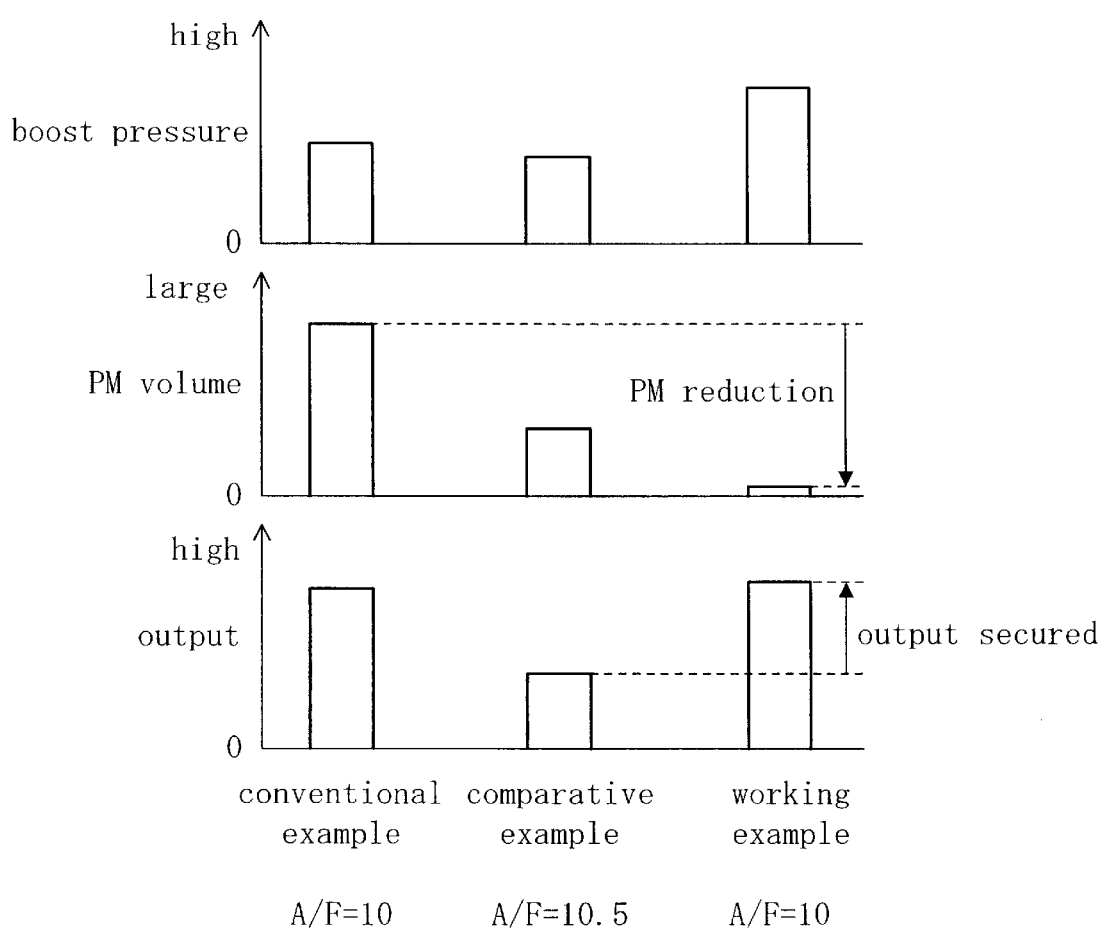
FIG. 14 is a graph showing the results of an experiment compared to a conventional example and a comparative example using the turbo boost pressure, the volume of PM exhaust, and the engine output in the specific region on the high-speed high-load side.

FIG. 14 shows the results of an experiment in which three direct injection engines with supercharger, which are like that of the present embodiment, are used to compare the amount of PM in the exhaust and the engine output, for example. In the high-speed high-load specific region, in one of the engines the air-fuel ratio of the air-fuel mixture is simply enriched as has been the done conventionally (conventional example), in another engine the air-fuel ratio A/F of the air-fuel mixture is set slightly lean at A/F=10.5 in order to reduce the volume of fuel injection at this time and inhibit the creation of PM (comparative example), and in the engine detailed above, the boost pressure is increased to the maximum level and a special effort is made to limit the intake air (working example).

From this drawing, it can be understood that with the engine of the conventional example a sufficiently high output is achieved but that there is also a large volume of PM exhaust. Also, it can be understood that with the engine of the comparative example the volume of PM exhaust is significantly reduced by making the air-fuel ratio A/F slightly lean, but that there is also a concurrent drop in output. It should be noted that this engine is for comparison, and that the reason the boost pressure has been slightly lowered is to prevent an excessive rise in exhaust temperature, however, diminished output could not have been avoided even if the boost pressure was equal to that of the conventional example.

Compared to the conventional and comparative examples, in the working example according to the present invention, as mentioned above, the maximum boost pressure of the turbocharger 40 is increased and the resulting increase in air intake is constricted by the TSCVs 30 in order to strengthen the tumble flow as much as possible. As a result, vaporization and atomization of the fuel can be sufficiently promoted so that there is an significant reduction in the volume of PM exhaust, as shown in the drawing. Moreover, at the same time, closing the TSCVs compensates for the drop in intake efficiency by increasing the boost pressure, and thus a high output equal to that of the conventional example can be obtained as shown in the drawing.

Therefore, according to the spark-ignition direct injection engine 1 with supercharger according to this embodiment, when the engine 1 is in the specific region on the high side of the enriched region (III), the air-fuel ratio of the air-fuel mixture in the cylinders 2 is made richer the more the engine is in the high-speed or the high-load side in order to keep the exhaust temperature from rising due to the latent heat of the fuel, and therefore the dependability of the exhaust system can be ensured.

At this time, exhaust energy that has conventionally been discarded can be utilized to further boost the intake air by the turbocharger 40, and by constricting this intake air, the tumble flow T of the combustion chambers 6 can be strengthened as much as possible, and thus the vaporization and the atomization of the large volume of fuel can be sufficiently promoted and the PM exhaust can be reduced.

Closing the TSCVs 30 to constrict the intake air in this way results in a drop in air intake efficiency, but the boost pressure is increased so that the charging efficiency to the cylinders 2 does not drop even under these conditions, and thus the maximum high output of the engine 1 can be reliably maintained. Moreover, this does not lead to fluctuations in engine output, even when the driving condition of the engine 1 shifts between the specific region and other regions.

Furthermore, because the engine 1 of this embodiment requires the provision of the TSCVs 30 in order to achieve a suitable air guided stratified combustion and the TSCVs 30 can also be used to achieve the above action, the above effects can be sufficiently attained without requiring additional new hardware or leading to increased costs or a more complicated structure.

Other Embodiments

The present invention is not limited to the configuration of the above embodiment, and can encompass various other configurations. For example, in the above embodiment, particular attention was given to the tumble flow T as the flow within the cylinders, and the tumble flow T was strengthened by constricting the flow of the intake air into the cylinders 2 by the TSCVs 30 provided in the intake passage 23 and the stepping motor 31, however, there is no limitation to this, and in an engine provided with two or more intake valves, the intake air to the cylinders 2 may be constricted by providing and operating a mechanism that forcibly reduces the amount of lift of at least one of these intake valves, or alternatively by providing a mechanism that forcibly stops the opening action of one or two of the intake valves, in order to strengthen flow such as the tumble flow T or the swirl flow, for example, within the cylinders.

In the above embodiment, the boost pressure adjustment means was configured by the wastegate valve 42 for adjusting the maximum boost pressure of the turbocharger 40, but there is no limitation to this, and for example it is possible to employ a variable turbocharger in which the boosting efficiency can be varied by constricting the exhaust into the turbine in order to change the speed of the exhaust.

Also, the supercharger is not limited to a turbocharger, and for example a mechanical supercharger which is driven by the crankshaft 8 of the engine 1 or an electric motor can also be used, in which case the boost pressure adjustment means can be configured by an adjustment mechanism that adjusts the relief valve for letting the boost pressure escape and adjusts the driving force of the supercharger.

Furthermore, in the above embodiment, the present invention was applied to a so-called air guided type direct injection engine, however, there is no limitation to this, and the present invention can be similarly applied to a so-called wall guided type direct injection engine, in which fuel that is directly injected into the combustion chamber by the injector is guided by the wall of the cavity in the top surface of the piston and stratified around the electrode of the spark plug.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A spark-ignition type 4-cycle direct injection engine, comprising a supercharger for boosting intake air into a cylinder and a fuel injection valve for directly injecting and supplying fuel to a combustion chamber within the cylinder, wherein in at least a supercharge region on a high-speed high-load side, fuel is injected during an intake stroke of the cylinder by the fuel injection valve to attain a state of homogenous combustion, the spark-ignition type 4-cycle direct injection engine comprising:

a flow strengthening means for constricting the flow of intake air into the cylinder and strengthening a flow within the cylinder;

a boost pressure adjustment means for keeping a boost pressure of the intake air due to the supercharger below a target boost pressure;

an air-fuel ratio control means for controlling an air-fuel ratio A/F in the cylinder so that $A/F \leq 13$ in a specific driving region that is established on the high-speed high-load side within the supercharge region;

a flow control means for increasing the amount of constriction on the intake air with the flow strengthening means, so as to relatively strengthen the flow in the cylinder in the specific driving region as compared to that in a region that is adjacent to a low-load side of the specific driving region, even if an engine revolution speed is the same; and a boost pressure control means for controlling the boost pressure adjustment means to relatively increase the target boost pressure in the specific driving region as compared to that in a region that is adjacent to a low-speed side of the specific driving region.

2. The spark-ignition type direct injection engine with supercharger according to claim 1, wherein
the boost pressure control means increases the target boost pressure so as to compensate a drop in an intake efficiency that is caused when the flow control means controls the flow strengthening means to increase the amount of constriction on the intake air.

3. The spark-ignition type direct injection engine with supercharger according to claim 1, wherein
the flow control means is configured so that it minimizes the amount of constriction on the intake air due to the flow strengthening means in at least the supercharge region aside from the specific region.

4. The spark-ignition type direct injection engine with supercharger according to claim 1, wherein
the flow strengthening means is provided with a flow control valve that is disposed in an intake passage to the cylinder, and an actuator for adjusting an opening degree of the flow control valve; and
wherein the flow control means is configured so that it controls the opening degree of the flow control valve by an operation of the actuator.

5. The spark-ignition type direct injection engine with supercharger according to claim 4, wherein the opening degree of the flow control valve is reduced to strengthen a tumble flow, which serves as the flow in the cylinder;

the fuel injection valve is disposed in opposition to the tumble flow that flows through the combustion chamber in the cylinder during a compression stroke of the cylinder;

a fuel injection control means is provided, which in a predetermined driving region on the low-speed low-load side, injects fuel toward the tumble flow during the compression stroke of the cylinder with the fuel injection valve, so that the fuel injected by the fuel injection valve becomes a combustible air-fuel mixture in a spark period of the cylinder and stays near the electrode of the spark plug; and the flow control means is configured so that it closes the flow control valve in the predetermined driving region and in the specific driving region.

6. A spark-ignition type 4-cycle direct injection engine, comprising a fuel injection valve for directly injecting and supplying fuel to a combustion chamber within a cylinder, a turbocharger for receiving exhaust from the combustion chamber and boosting it, and a controller for injecting fuel with the fuel injection valve during an intake stroke of the cylinder so as to attain a state of homogenous combustion in at least a supercharge region on a high-speed high-load side, the spark-ignition type 4-cycle direct injection engine comprising:

a flow control valve that is disposed in an intake passage to the cylinder; and a relief valve for bypassing a portion of the exhaust from the combustion chamber to a downstream side of the turbocharger to keep a boost pressure of the intake air below a target boost pressure;

wherein the controller, in a specific driving region that is established at the high-speed high-load side within the supercharge region, controls a volume of fuel injected by the fuel injection valve so that an air-fuel ratio A/F in the cylinder becomes A/F≦13, and the controller is configured to control an opening degree of the flow control valve in order to relatively strengthen the flow in the cylinder as compared to that in a driving region that is adjacent to a low-load side of the specific driving region, even if an engine revolution speed is the same, and moreover control an opening degree of the relief valve in order to relatively increase the target boost pressure as compared to that in a driving region that is adjacent to a low-speed side of the specific driving region.

7. The spark-ignition type direct injection engine with supercharger according to claim 6, wherein the controller is configured to increase the target boost pressure by controlling the opening degree of the relief valve and thereby compensate a drop in intake efficiency that is caused when the amount of constriction on the intake air is increased by the flow control valve of the intake passage.

* * * * *